J. P. PROBST.
FILTER.
APPLICATION FILED MAR. 17, 1919.
1,361,493. Patented Dec. 7, 1920.
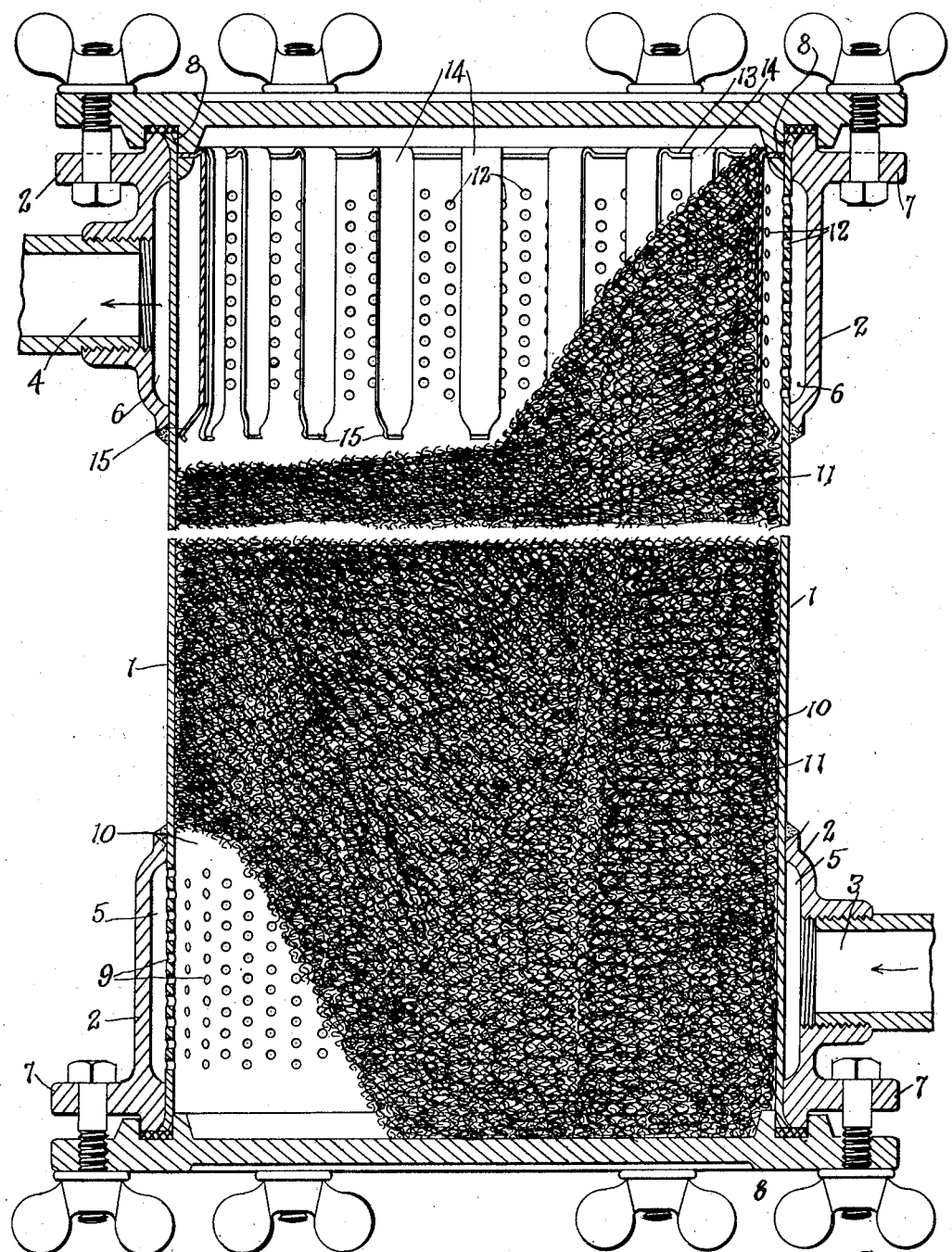
John Philip Probst, Inventor

UNITED STATES PATENT OFFICE.

JOHN PHILIP PROBST, OF MARION, OHIO.

FILTER.

1,361,493.  Specification of Letters Patent.  Patented Dec. 7, 1920.

Application filed March 17, 1919. Serial No. 283,028.

*To all whom it may concern:*

Be it known that I, JOHN PHILIP PROBST, a citizen of the United States, residing at Marion, in the county of Marion and State of Ohio, have invented certain new and useful Improvements in Filters, of which the following is a specification, reference being had therein to the accompanying drawing.

This invention relates to filters and has for its object to provide an improved filter of the type disclosed in Patent No. 1,247,875, issued to me Nov. 27th, 1917.

In filters of this character it is important to cause the water, or other liquid passing through the device to flow evenly through the filtering material, thus avoiding the formation of pools or pockets in which the liquid may to some extent become stagnated.

In the present invention even distribution of the liquid through the filtering material is accomplished by causing the liquid to enter the device through a perforated wall forming the body portion of the filter adjacent the intake orifice, surrounding a portion of the filtering material and causing the liquid to be equally distributed over the entire surface thereof adjacent the perforated wall.

A further object of the present invention is to provide a similar arrangement of perforated wall at the discharge end of the filter for the stated purpose of causing the liquid to flow freely and evenly from the device. The filtering material, which consists preferably as here shown of sponges, occupies the entire inner portion of the device, and, therefore, as a result of the present improved construction, permits the liquid to enter, pass through and be delivered from the device, evenly distributed and thoroughly filtered.

An improvement of the present construction consists in the simplicity of construction; the convenient accessibility of the parts for cleansing and renewal; and the dependability of the filter in its use.

Referring to the drawings:

The figure is an elevation in cross section showing the novel features of construction and arrangement of the invention.

The body portion of the filter consists of the usual cylindrical casing 1 which in the present construction is preferably formed of metal. Both ends of the casing are open and may be closed in any suitable manner to form water tight ends.

Both ends of the casing as here shown are provided with an integral casting 2 in which the intake port 3 and outlet port 4 are located respectively. The castings are provided with inner depressed portions which form annular channels between the casting and the casing and constitute, respectively, the receiving and distributing chamber 5 and collecting and delivering chamber 6. The castings are further provided with outwardly projecting flanges 7 by means of which the end covers may be secured to the casing.

The casting 2 may be secured to the casing in any suitable manner. As here shown the edges of the cylinder walls are preferably flared outwardly, as indicated at 8, to form a tight joint with the outer edge of the casting 2. A tight joint between the opposite edge of the casting and the casing may be obtained by soldering or brazing the joint.

The lower portion of the cylindrical casing over the entire periphery thereof except the portion immediately opposite the intake port 3, as here shown, is provided with perforations or apertures 9 which admit the liquid introduced through the port 3 under pressure into the distributing chamber 5, and then into the filtering chamber 10 which may be filled with any suitable filtering material 11; the annular distributing chamber and the perforated wall serving to introduce the liquid evenly to all portions of the filtering material, and the perforated walls acting to strain the liquid as it passes therethrough.

As stated, the casing 1 is filled with the filtering material 11. To prevent the material contacting with and clogging the perforations 12 in the upper portion of the casing an annular rim 13 provided with downwardly projecting blades or fingers 14 is fitted into the opening of the casing. The fingers 14 are spaced apart and away from the casing a sufficient distance to prevent the sponge material contacting with the perforated wall of the casing and are prevented from being forced outwardly at their lower ends by a bent or foot portion 15 which contacts with the wall of the casing.

The extent and arrangement of the perforations in the upper casing wall, as here shown, are substantially the same as in the lower wall, the portion of the wall immediately adjacent the discharge aperture 4 not being perforated so that the water discharged through the aperture will be drawn from the delivering chamber 6.

From the foregoing detailed description it will be apparent that the objects of my invention are effectually realized in the construction of a filter, as here shown. The construction shown is the preferred arrangement for putting my invention into practice, but will admit of substantial variations in the details of construction and arrangement without departing from the essential features of the invention.

While, as here shown, both ends of the filter casing are provided with perforations and the annular channels extending thereover, it will be understood that under certain conditions it may be desirable to use the improved construction at one end of the filter only, at either the intake or discharge end, the opposite end being modified in construction accordingly.

Having thus fully described my invention, what I claim as new and desire to secure by Letters Patent, is:—

1. In a filter, a cylindrical casing having extended surfaces of its wall at the upper and lower ends thereof perforated, annular members secured to the opposite ends of the casing, and having depressions constituting annular chambers extending over said perforated portions, inlet and discharge ports in said members, respectively, filtering material interposed in said casing between said chambers, and means at the discharge end of the casing to prevent contact of the filtering material with said perforations.

2. In a filter, a cylindrical casing having extended surfaces of its walls at the upper and lower ends thereof perforated, integral castings secured to opposite ends of the casing, having flanges adapted to have the end closure of the casing secured thereto, and annular chambers formed in said castings extending over said perforated portions, inlet and discharge ports in said members, respectively, and filtering material interposed in said casing between said chambers.

3. In a filter, a casing adapted to have liquid introduced thereinto at one end thereof, a discharge port and delivery chamber coöperating therewith at the opposite end of the casing, perforations arranged in the casing and opening into said chamber, and filtering material interposed between the ends of the casing, and guards acting to prevent contact of the material with said apertures.

In testimony whereof I affix my signature.

JOHN PHILIP PROBST.